(12) United States Patent
Kikuchi

(10) Patent No.: US 7,211,612 B2
(45) Date of Patent: May 1, 2007

(54) TREAD RUBBER COMPOSITION AND PNEUMATIC TIRE EMPLOYING THE SAME

(75) Inventor: Naohiko Kikuchi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 292 days.

(21) Appl. No.: 10/372,895

(22) Filed: Feb. 26, 2003

(65) Prior Publication Data

US 2003/0166759 A1 Sep. 4, 2003

(30) Foreign Application Priority Data

Feb. 28, 2002 (JP) ............... 2002-053155

(51) Int. Cl.
*C08K 3/20* (2006.01)
*C08K 3/04* (2006.01)
*C08F 236/00* (2006.01)

(52) U.S. Cl. ............ 524/437; 524/495; 524/496; 525/333.1

(58) Field of Classification Search ......... 524/430, 524/495, 496, 437; 525/333.1, 333.2
See application file for complete search history.

(56) References Cited

U.S. PATENT DOCUMENTS 5,049,598 A 9/1991 Saito et al.
5,227,425 A 7/1993 Rauline
6,573,323 B2 * 6/2003 Kikuchi et al. ............ 524/437
2001/0023271 A1 9/2001 Kikuchi et al.

FOREIGN PATENT DOCUMENTS

| EP | 0 807 603 A2 | 11/1997 |
| EP | 1 112 961 A1 | 7/2001 |
| JP | 60-147450 A | 8/1985 |
| JP | 3-135241 A | 5/1990 |
| JP | 2001/180929 A | 7/2001 |
| JP | 2001-181447 A | 7/2001 |
| JP | 2001-181449 A | 7/2001 |

* cited by examiner

*Primary Examiner*—Tae H Yoon
(74) *Attorney, Agent, or Firm*—Birch, Stewart, Kolasch & Birch, LLP

(57) ABSTRACT

A tread rubber composition improved both in grip performance on ice-covered and snow-covered road surfaces and in abrasion resistance is provided. The tread rubber composition contains aluminum hydroxide having an untamped density of not more than 0.60 g/cm$^3$, a DOP oil absorption of at least 70 cm$^3$/100 g and less than 250 cm$^3$/100 g, and a BET specific surface area of at least 30 m$^2$/g and not more than 350 m$^2$/g in an amount of 5–60 parts by weight with respect to 100 parts by weight of a rubber component containing at least 50% by weight of at least one of polyisoprene rubber and polybutadiene rubber. The tread rubber composition has a tanδ peak temperature of not more than −45° C. and a type A durometer hardness at 0° C. of not more than 64.

17 Claims, No Drawings

TREAD RUBBER COMPOSITION AND PNEUMATIC TIRE EMPLOYING THE SAME

BACKGROUND OF THE INVENTION

1. Field of the Invention

The present invention relates to a tread rubber composition improved in grip performance on wet road surfaces, especially on ice-covered and snow-covered road surfaces, and in abrasion resistance, and a pneumatic tire employing the same.

2. Description of the Background Art

In recent years, in response to the demands for fuel-efficient automobiles, tires decreased in rolling resistance and improved in wet grip performance have been developed. As a technique to decrease the rolling resistance, carbon black conventionally used as a reinforcing agent has been partially replaced with silica, in an effort to balance the antinomic properties of fuel efficiency and grip performance.

For example, U.S. Pat. No. 5,227,425 discloses a technique to improve the grip performance by a combination of specific silica and mixing method.

Japanese Patent Laying-Open No. 2-135241 discloses a technique to improve ice skid properties, wherein 100 parts by weight of natural rubber and/or diene-based synthetic rubber is blended with 10–80 parts by weight of low-temperature plasticizer having a freezing point of not greater than −48° C. and 5–40 parts by weight of silicon carbide, silicon nitride or the like having an average particle diameter of 0.1–1 mm.

Further, Japanese Patent Laying-Open No. 60-147450 discloses a tire tread rubber composition having high coefficient of friction on ice, wherein 100 parts by weight of natural rubber and/or diene-based synthetic rubber is blended with 10–80 parts by weight of low-temperature plasticizer having a freezing point of not greater than −40° C. and 5–45 parts by weight of alumina having an average particle diameter of 0.01–0.5 mm.

Still further, Japanese Patent Laying-Open No. 2001-181447 discloses a tread rubber composition improved in both grip performance and abrasion resistance and reduced in rolling resistance, wherein 100 parts by weight of rubber component including at least 60 parts by weight of styrene-butadiene copolymer containing 20–60% by weight of styrene is blended with 50–80 parts by weight of aluminum hydroxide having an untamped density of not greater than 0.6 g/cm², a DOP oil absorption of not lower than 70 cm³/100 g and less than 250 cm³/100 g and a BET specific surface area of 30–350 m²/g, and 10–100 parts by weight of carbon black having a BET specific surface area of not lower than 70 m²/g.

The conventional techniques described above, however, fail to improve abrasion resistance and grip performance both at ordinary temperature (about 20° C.) and at low temperature (about 0° C.). A tread rubber composition which can keep its properties at low temperature the same as at ordinary temperature, has conventionally been demanded.

SUMMARY OF THE INVENTION

An object of the present invention is to provide a tread rubber composition which exhibits a small change in hardness between at ordinary temperature and at low temperature, remaining soft at the low temperature, and also exhibits a small change in hardness under a heat aging condition, and which is excellent in grip performance during a run on ice-covered and snow-covered road surfaces, and also improved in abrasion resistance, and to provide a pneumatic tire using the same.

The present invention provides a tread rubber composition containing aluminum hydroxide having an untamped density of not more than 0.60 g/cm³, a DOP oil absorption of at least 70 cm³/100 g and less than 250 cm³/100 g, and a BET specific surface area of at least 30 m²/g and not more than 350 m²/g in an amount of 5–60 parts by weight with respect to 100 parts by weight of a rubber component containing at least 50% by weight of at least one of polyisoprene rubber and polybutadiene rubber, characterized in that a tanδ peak temperature is not more than −45° C. and a type A durometer hardness at 0° C. is not more than 64.

The untamped density of the aluminum hydroxide is preferably at least 0.10 g/cm³ and not more than 0.35 g/cm³. Further, the aluminum hydroxide preferably has a crystal structure of boehmite type, and a crystal size of boehmite (020) plane is preferably at least 5 nm and not more than 20 nm.

In the tread rubber composition of the present invention, at least one kind of silane coupling agent expressed by the following general formula (1) or (2) is preferably blended 1–10 parts by weight with respect to 100 parts by weight of the rubber component:

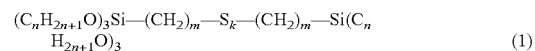

$$(C_nH_{2n+1}O)_3Si-(CH_2)_m-S_k-(CH_2)_m-Si(C_nH_{2n+1}O)_3 \qquad (1)$$

(wherein m is an integer from 1 to 6, n is an integer from 1 to 4, and k is an integer from 1 to 6),

$$(C_nH_{2n+1}O)_3Si-(CH_2)_m-R \qquad (2)$$

(wherein m is an integer from 1 to 6, n is an integer from 1 to 4, and R is an organic functional group having mercapto group, amino group, epoxy group or vinyl group).

Further, in the tire tread rubber composition of the present invention, the mixed amount of the polyisoprene rubber and/or the polybutadiene rubber with respect to the entire rubber component is at least 80% by weight.

Still further, the present invention provides a pneumatic tire employing the tread rubber composition as described above.

The foregoing and other objects, features, aspects and advantages of the present invention will become more apparent from the following detailed description of the present invention.

DESCRIPTION OF THE PREFERRED EMBODIMENTS

Rubber Component

The present invention is formed of a rubber component having at least one of polyisoprene rubber and polybutadiene rubber as its main component. Here, polyisoprene rubber is a concept including natural rubber (NR) and synthetic polyisoprene rubber (IR), and natural rubber is suitably used. Polybutadiene rubber (BR) includes high cis 1,4 polybutadiene rubber having at least 60% of cis 1,4 bond, low cis 1,4 polybutadiene rubber, and 1,2 polybutadiene rubber having 1,2 bond. Preferably employed are natural rubber, synthetic polyisoprene rubber, and high cis polybutadiene rubber containing at least 90% of cis 1,4 bond.

The rubber composition of the present invention includes at least 50% by weight of polyisoprene rubber and/or polybutadiene rubber in the rubber component. To make the hardness changes at low temperature and under the heat aging condition small and to maintain excellent grip performance for a long time period, the polyisoprene rubber and/or the polybutadiene rubber needs to be blended at least 50% by weight, and preferably at least 80% by weight, in the rubber component.

Other rubber components mixed with polyisoprene rubber and/or polybutadiene rubber in the tred rubber composition of the present invention include styrene-butadiene copolymer rubber (SBR), butyl rubber (IIR), halogenated butyl rubber, acrylonitrile-butadiene rubber (NBR), acrylonitrile-styrene-butadiene copolymer rubber, chloroprene rubber, ethylene-propylene copolymer rubber, styrene-isoprene copolymer rubber, styrene-isoprene-butadiene copolymer rubber, isoprene-butadiene copolymer rubber, chlorosulfonic polyethylene, acrylic rubber, epichlorohydrin rubber, silicone rubber, and urethane rubber. They may be used alone or two or more kinds thereof may be mixed together.

In particular, for the purposes of improving processibility and abrasion resistance of the rubber composition, styrene-butadiene copolymer rubber, styrene-isoprene-butadiene copolymer rubber and the like are preferable. The styrene-butadiene copolymer rubber preferably has the styrene content of 20–60% by weight. When the styrene content is at least 20% by weight, grip performance is improved at low and high temperature regions. If it exceeds 60% by weight, the rubber composition increases in hardness, making it impossible to obtain desired grip performance on a snow-covered road surface. The styrene content of 20–45% by weight is particularly preferable. Such styrene-butadiene copolymer rubber is synthesized by emulsion polymerization, solution polymerization or the like.

Aluminum Hydroxide

The aluminum hydroxide used in the present invention has an untamped density, as measured conforming to JIS R9301-2-3, of not more than 0.60 g/cm$^3$, and preferably at least 0.10 g/cm$^3$ and not more than 0.35 g/cm$^3$. If it is greater than 0.60 g/cm$^3$, abrasion resistance of the rubber composition considerably deteriorates. If it is too low, torque when mixing the aluminum hydroxide and the rubber increases, thereby degrading the workability.

Further, the aluminum hydroxide used in the present invention has a DOP oil absorption, as measured conforming to JIS K6221 (1982), of at least 70 cm$^3$/100 g and less than 250 cm$^3$/100 g, and preferably at least 90 cm$^3$/100 g and not more than 150 cm$^3$/100 g. If it is out of such a range, the rubber composition suffers degradation of its abrasion resistance.

Still further, the aluminum hydroxide has a BET specific surface area, as measured by nitrogen adsorption, of at least 30 m$^2$/g and not more than 350 m$^2$/g, preferably at least 30 m$^2$/g and not more than 200 m$^2$/g, and more preferably more than 100 m$^2$/g and not more than 200 m$^2$/g. If it is less than 30 m$^2$/g, the abrasion resistance tends to deteriorate. If it exceeds 350 m$^2$/g, torque when mixing the aluminum hydroxide and the rubber may increase, thereby degrading the workability.

Moreover, for the purposes of improving the grip performance and the abrasion resistance of the rubber composition, the aluminum hydroxide used in the present invention preferably has a crystal structure of boehmite type. More preferably, the crystal size of boehmite (020) plane is at least 5 nm and not more than 20 nm.

The crystal size was calculated as follows. Peaks of the boehmite (020) planes were measured from the profile obtained using an X-ray diffractometer. For these peaks of the crystal planes, fitting was conducted, based on the Gaussian distribution, using software for "multi-peak separation" of RINT 2100. Using the half-value width of the calculated result and the peak angle obtained by the barycentric method, the crystal size was calculated by the Scherrer's formula. The measurement conditions for the X-ray diffraction were as follows.

Measurement device: Rint-2100V from Rigaku International Corporation.

Measurement conditions: Cu target; Voltage×Current=40 kV×40 mA; Slit: DS1°–SS1°–RS 0.3 mm; Scan mode: continuous; Scan speed=2°/min; Scan step=0.010°/step; Scan axis: 2θ/θ; Scan range: 2–70°; and Rotation speed: 0 rpm.

A blended amount of the aluminum hydroxide described above is 5–60 parts by weight, and preferably 5–40 parts by weight, with respect to 100 parts by weight of the rubber component described above. Blending the aluminum hydroxide exhibits the following advantages. The hardness of the rubber composition at low temperature can be kept low, which improves the grip performance on ice-covered and snow-covered road surfaces at an early stage of tire use. The increasing rate of hardness of the rubber composition when the aluminum hydroxide is blended is small, which can restrict the use of softening agent. Further, the increase of hardness through tire use over a long time period is alleviated, allowing the grip performance on ice-covered and snow-covered road surfaces to be maintained. If the blended amount of the aluminum hydroxide is less than 5 parts by weight, the abrasion resistance is improved only to a small extent. If it exceeds 60 parts by weight, viscosity of the rubber composition increases to deteriorate the processibility. Hardness also increases to degrade the grip performance on ice-covered and snow-covered road surfaces.

Peak Temperature of tanδ

The peak temperature of tanδ of the rubber composition of the present invention is required to be not greater than −45° C. If it exceeds −45° C., the rubber composition becomes harder at low temperature, and the hardness change under the heat aging condition also increases. This hinders improvement of the grip performance on ice-covered and snow-covered road surfaces and the abrasion resistance. The tanδ peak temperature is preferably not greater than −51° C.

Type A Durometer Hardness of Rubber Composition

The rubber composition of the present invention has the type A durometer hardness of not more than 64 at 0° C. The hardness of the rubber composition at low temperature (0° C.) greatly affects the grip performance on ice-covered and snow-covered road surfaces. In general, the rubber composition increases in hardness when the temperature decreases from the ordinary temperature to the low temperature. Thus, even the rubber composition optimal in terms of abrasion resistance and grip performance at ordinary temperature would suffer increased hardness and considerably deteriorated grip performance at low temperature. The present invention minimizes the change in hardness due to a temperature change, thereby making it possible to keep the grip performance and the abrasion resistance at low temperature at the same levels as those at the ordinary temperature (about 20° C.). The rubber composition of the present invention preferably has the type A durometer hardness (H3) at 0° C. of 48–55, and the type A durometer hardness (H1) at ordinary temperature (20° C.) of 46–53. The hardness difference therebetween (H3−H1) is preferably not greater than 3.

Producing Method of Aluminum Hydroxide

One way of producing the aluminum hydroxide used in the present invention is as follows. Aluminum alkoxide is hydrolized to obtain slurry of aluminum hydroxide, which is passed through a continuous wet grinder or the like to obtain suspension. The obtained suspension is alkalinized, then subjected to heat treatment at about 100° C. to about 140° C. for about 10 hours to about 100 hours, and then dried using a flash dryer or the like. In this method of producing the aluminum hydroxide, it is preferable that the suspension having undergone the heat treatment is subjected to solid-liquid separation to extract the solid content (aluminum hydroxide) and then the solid content is washed to remove impurities.

Silane Coupling Agent

A silane coupling agent is preferably added to the rubber composition of the present invention to increase the reinforcing effect of the aluminum hydroxide. The silane coupling agent is blended preferably 1–10 parts by weight with respect to 100 parts by weight of the rubber component. If the silane coupling agent is less than 1 part by weight, the effect of reinforcing the rubber composition is insufficient, leading to insufficient abrasion resistance and cut resistance. If it exceeds 10 parts by weight, the hardness of the rubber composition increases, resulting in insufficient grip performance on ice-covered and snow-covered road surfaces.

Here, the silane coupling agent having a chemical structure shown by the following general formula (1) or (2) is suitably used.

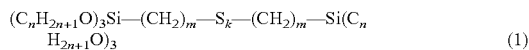

$(C_nH_{2n+1}O)_3Si-(CH_2)_m-S_k-(CH_2)_m-Si(C_nH_{2n+1}O)_3$ (1)

(In the formula, m is an integer from 1 to 6, n is an integer from 1 to 4, and k is an integer from 1 to 6.)

$(C_nH_{2n+1}O)_3Si-(CH_2)_m-R$ (2)

(In the formula, m is an integer from 1 to 6, n is an integer from 1 to 4, and R is an organic functional group having mercapto group, amino group, epoxy group or vinyl group.)

The silane coupling agents expressed by the general formulas (1) and (2) above include: bis (3-triethoxysilylpropyl) tetrasulfide, bis (2-triethoxysilylethyl) tetrasulfide, bis (3-trimethoxysilylpropyl) tetrasulfide, bis (2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-aminopropyltrimethoxysilane, 3-aminopropyltriethoxysilane, 3-chloropropyltrimethoxysilane, 3-chloropropyltriethoxysilane, 2-chloroethyltrimethoxysilane, 2-chloroethyltriethoxysilane, 3-vinyltrimethoxysilane, and 3-vinyltriethoxysilane. Among them, bis (3-triethoxysilylpropyl) tetrasulfide or the like is preferable for balancing the cost and the effect expected by adding the coupling agent.

The silane coupling agent having the above structure is effectively reacted with the rubber molecule and the aluminum hydroxide, thereby further ensuring reinforcement of the rubber composition.

Carbon Black

The carbon black being blended into the tread rubber composition of the present invention has a BET specific surface area, as measured by nitrogen adsorption, of at least 70 m²/g, preferably 70–220 m²/g, and more preferably 70–200 m²/g. The BET specific surface area of less than 70 m²/g is not preferable, since an adequate level of abrasion resistance cannot be expected. Here, the BET specific surface area was measured conforming to the ASTM D6556-01a method.

The blended amount of the carbon black is 10–100 parts by weight, and preferably 10–50 parts by weight, with respect to 100 parts by weight of the rubber component described above. If it is less than 10 parts by weight, abrasion resistance is deteriorated. If it exceeds 100 parts by weight, viscosity of the rubber increases, thereby degrading the processibility.

Other Ingredients

The rubber composition of the present invention may be blended with silica. Here, both silica obtained by a dry process and silica obtained by a wet process (hydrated silicate) may be employed. Silica preferably has a BET specific surface area of 70–300 m²/g for the purposes of improving fuel efficiency and abrasion resistance of the tire tread rubber composition. Silica may be used together with carbon black or may be used alone. Silica is preferably blended in an amount of 5–70 parts by weight with respect to 100 parts by weight of the rubber component.

In the present invention, other fillers such as clay, calcium carbonate and the like may be used together. Various kinds of additives including process oil, antioxidant, stearic acid, zinc oxide and wax, and vulcanizing agents such as sulfur, vulcanization accelerator and the like may also be blended as appropriate.

EXAMPLES

Examples 1–4 and Comparative Examples 1–5

Tire tread rubber compositions were prepared as follows. Ingredients as shown in Table 2 were blended as specified therein, and kneaded using a Banbury mixer to prepare respective rubber compositions. Thereafter, an extruder was used to extrude the respective rubber compositions each into a sheet shape, which was then vulcanized in a mold. For each test piece obtained, peak temperature of tanδ, type A durometer hardness and abrasion resistance were evaluated. The evaluation results are shown in Table 3.

The aluminum hydroxide employed in each of these examples and comparative examples was produced as follows. Characteristic values thereof are shown in Table 1.

Aluminum Hydroxide A 376 g of aluminum hydroxide (untamped density: 0.77 g/cm³, DOP oil absorption: 70 cm³/100 g) obtained by hydrolizing aluminum alkoxide was mixed with 5 dm³ of water, and suspension having a solid content of 7% by weight was prepared. The suspension was passed through a continuous bead mill to let the aluminum hydroxide uniformly disperse in the suspension. The suspension after such dispersion was put into a stainless beaker, and adjusted to have a pH of 10 using 1N NaOH. With a refluxing device attached to the stainless beaker, the suspension within the stainless beaker was heated, left at 100° C. for 60 hours, and gradually cooled. The suspension was then separated to solid and liquid employing a centrifugal separator. After removing the supernatant liquid, the solid content was dispersed in 5 dm³ of water added. A centrifugal separator was again used for solid-liquid separation thereof. The solid content thus obtained was dispersed in 5 dm³ of newly added water to obtain slurry of aluminum hydroxide, which was passed through a continuous bead mill, and then dried with a flash dryer (trade name: Flash Jet Dryer, manufactured by Seishin Enterprise Co., Ltd.). Aluminum hydroxide A was thus obtained. Physical properties of the aluminum hydroxide A obtained are shown in Table 1.

Aluminum Hydroxide B 376 g of aluminum hydroxide (untamped density: 0.77 g/cm³, DOP oil absorption: 70 cm³/100 g) obtained by hydrolizing aluminum alkoxide was mixed with 5 dm³ of water, and suspension having a solid content of 7% by weight was prepared. 1N NaOH was used to set a pH of this suspension to 10. The suspension was then put into an autoclave and held at 120° C. for 24 hours. The suspension was gradually cooled, and then subjected to solid-liquid separation employing a centrifugal separator. After removal of the supernatant liquid, the solid content was dispersed in 5 dm³ of water added. Solid-liquid separation was conducted again using a centrifugal separator. The solid content obtained was dispersed in 5 dm³ of newly added water to obtain slurry of aluminum hydroxide, which was passed through a continuous bead mill, and then dried using a flash dryer (trade name: Flash Jet Dryer, manufactured by Seishin Enterprise Co., Ltd.). Aluminum hydroxide B was thus obtained. Physical properties of the obtained aluminum hydroxide B are shown in Table 1.

Aluminum Hydroxide C 533 cm³ of sodium alminate solution (sodium concentration: 125 g/dm³ in terms of $Na_2O$, $Na_2O/Al_2O_3$ molar ratio: 1.55) as a basic solution and 880 cm³ of aqueous aluminum sulfate solution (alminum concentration: 5.3% by weight in terms of $Al_2O_3$) as an acid solution were injected into a 2-dm³ stainless bath provided with a baffle for about three minutes for neutralization. During the injection, the solutions were being cooled with ice and stirred using a homo-mixer (trade name: T. K. Homo-Jetter M type, manufactured by Tokushu Kika Kogyo Co., Ltd.) under the condition of shear rate of 11000 sec$^{-1}$. (The shear rate was derived from the peripheral velocity of the turbine of the homo-mixer, x m/sec, and the clearance between the turbine and the status, y mm, using an expression of x/y×10³ sec$^{-1}$.) Thereafter, the stirring was continued for 15 minutes to obtain slurry of aluminum hydroxide. The maximum reachable temperature at the time of neutralization was 15° C.

A centrifugal separator was used for solid-liquid separation of the obtained slurry of aluminum hydroxide to extract the solid content. The solid content obtained was dispersed in 6 dm³ of water added, to obtain slurry of aluminum hydroxide. Thereafter, solid-liquid separation using a centrifugal separator was repeated seven times to wash the aluminum hydroxide. Water was added to the solid content extracted after such washing to obtain slurry of aluminum hydroxide, which was then dried using a spray dryer (from Niro A/S, trade name: Mobile Minor Type, drying temperature: 250° C. at dryer inlet and 100° C. at dryer outlet, atomizing pressure: 0.12 MPa). Aluminum hydroxide C was thus obtained, of which physical properties are shown in Table 1.

Aluminum Hydroxide D

Commercially available aluminum hydroxide (manufactured by Showa Denko K.K., trade name: Higilite H-43) was used without alternation.

As shown in Table 1, aluminum hydroxide C has a greater untamped density and a smaller crystal size of boehmite (020) plane as compared with those of Aluminum Hydroxide A and B. Aluminum hydroxide D has a small BET specific surface area and a small DOP oil absorption and its crystal structure is gibbsite, different from boehmite described above.

TABLE 1

|  | Untamped density; g/cm³ | DOP oil absorption; cm³/100 g | BET specific surface area; m²g | Crystal structure | Crystal size of boehmite (020) plane; nm |
|---|---|---|---|---|---|
| Aluminum Hydroxide A | 0.21 | 121 | 153 | boehmite | 12.9 |
| Aluminum Hydroxide B | 0.33 | 80 | 208 | boehmite | 7.3 |
| Aluminum Hydroxide C | 0.94 | 54 | 250 | boehmite | 2.4 |
| Aluminum Hydroxide D | 0.20 | 55 | 8 | gibbsite | — |

TABLE 2

| Ingredients | (Parts by weight) | Examples 1 | 2 | 3 | 4 | Comparative examples 1 | 2 | 3 | 4 | 5 |
|---|---|---|---|---|---|---|---|---|---|---|
| NR | *1) | 70 | 70 | 70 | 70 | 70 | 70 | 70 | 70 | 70 |
| BR | *2) | 30 | 30 | 30 | 30 | 30 | 30 | 30 | 30 | — |
| SBR | *3) | — | — | — | — | — | — | — | — | 30 |
| Carbon black N339 | *4) | 30 | 30 | 10 | 30 | 50 | 30 | 30 | 30 | 30 |
| Aluminum hydroxide A |  | 20 | 20 | 20 | — | — | — | — | — | 20 |
| Aluminum hydroxide B |  | — | — | — | 20 | — | — | — | — | — |
| Aluminum hydroxide C |  | — | — | — | — | — | — | 20 | — | — |
| Aluminum hydroxide D |  | — | — | — | — | — | — | — | 20 | — |
| Silica VN3 | *5) | — | 20 | 20 | — | — | 20 | — | — | 20 |
| Silane coupling agent | *6) | 1.6 | 3.2 | 3.2 | 1.6 | — | 1.6 | 1.6 | 1.6 | 1.6 |
| Aromatic oil | *7) | 10 | 30 | 10 | 15 | 30 | 30 | 10 | 10 | 30 |
| Antioxidant | *8) | 2.0 | 2.0 | 2.0 | 2.0 | 2.0 | 2.0 | 2.0 | 2.0 | 2.0 |
| WAX | *9) | 2.0 | 2.0 | 2.0 | 2.0 | 2.0 | 2.0 | 2.0 | 2.0 | 2.0 |
| Stearic acid | *10) | 2.0 | 2.0 | 2.0 | 2.0 | 2.0 | 2.0 | 2.0 | 2.0 | 2.0 |
| Zinc oxide | *11) | 3.0 | 3.0 | 3.0 | 3.0 | 3.0 | 3.0 | 3.0 | 3.0 | 3.0 |
| Sulfur | *12) | 1.5 | 1.5 | 1.5 | 1.5 | 1.5 | 1.5 | 1.5 | 1.5 | 1.5 |
| Vulcanization accelerator | *13) | 1.0 | 1.0 | 1.0 | 1.0 | 1.0 | 1.0 | 1.0 | 1.0 | 1.0 |

Details of the ingrediants shown in Table 2 are as follows:
*1) NR: natural rubber RSS#1
*2) BR: polybutadiene rubber BR150L (from Nippon Zeon Corporation)
*3) SBR: styrene-butadiene copolymer rubber SBR1502 (from Sumitomo Chemical Co., Ltd.), styrene content 23.5% by weight
*4) carbon black: Sho Black I (N339, from Showa Cabot K. K.), BET specific surface area by nitrogen adsorption: 88 m²/g
*5) silica: VN3 (from Degussa)
*6) silane coupling agent TESPT: Si-69 (from Degussa)
*7) aromatic oil: Process X140 (from Japan Energy Corp.)
*8) antioxidant: Ozonon 6C (from Seiko Chemical Co., Ltd.)
*9) WAX: Sannoc Wax (from Ouchishinko Chemical Industrial Co., Ltd.)
*10) stearic acid: Kiri (from NOF Corp.)
*11) zinc oxide: Zinc Oxide #2 (from Mitsui Mining & Smelting Co., Ltd.)
*12) sulfur: Sulfur (from Karuizawa Seirensho Co., Ltd.)
*13) vulcanization accelerator: Nocceler CZ (from Ouchishinko Chemical Industrial Co., Ltd.)

Evaluation methods employed for Examples and Comparative examples are as follows.

(1) Peak Temperature of tanδ (Glass Transition Point)

The tanδ peak temperature was obtained from the temperature distribution curve of tanδ measured using a viscoelastic spectrometer available from Iwamoto Seisakusho Co., Ltd., at a frequency of 10 Hz, initial strain of 10%, amplitude of ±0.25% and a programming rate of 2° C./min.

(2) Type A Durometer Hardness

The type A durometer hardness was measured with a type A durometer conforming to JIS K 6253. The smaller value corresponds to the better grip performance on ice-covered and snow-covered road surfaces.

The measurement results at ordinary temperature and at 0° C. were represented as hardness (H1) at ordinary temperature and hardness (H3) at 0° C. Further, the measurement result obtained after heat aging in an oven at 85° C. for 14 days, followed by cooling to ordinary temperature, was represented as hardness (H2) after heat aging. The smaller change in hardness after heat aging permits the grip performance to be maintained for a longer time period.

(3) Abrasion Resistance

An abrasion resistance test was conducted using a Lambourn abrasion tester FT-702 (from Iwamoto Seisakusho Co., Ltd.), conforming to JIS K 6264. The measurement was performed at 23° C. for five minutes, with a slip ratio of 20% and applying load of 40N, to measure the volume of abrasion loss. The measurements were represented as indices, with the abrasion loss of Comparative example 1 set to 100. The greater the index, the better the abrasion resistance becomes.

changes after heat aging (H2–H1) and due to temperature change (H3–H1), and are superior in abrasion resistance.

As described above, according to the present invention, a rubber composition having polyisoprene rubber and/or polybutadiene rubber as its main substance is blended with aluminum hydroxide whose untamped density is small and whose DOP oil absorption and BET specific surface area are within specific ranges, and the type A durometer hardness and the tanδ peak temperature of the rubber composition are adjusted. Accordingly, the rubber composition can keep hardness low at low temperature, and its hardness changes only slightly under a heat aging condition, ensuring excellent grip performance on ice-covered and snow-covered road surfaces and improved abrasion resistance. As such, a tread rubber composition exhibiting good processability and a pneumatic tire using the same are obtained.

Although the present invention has been described and illustrated in detail, it is clearly understood that the same is by way of illustration and example only and is not to be taken by way of limitation, the spirit and scope of the present invention being limited only by the terms of the appended claims.

TABLE 3

|  | Examples | | | | Comparative examples | | | | |
| --- | --- | --- | --- | --- | --- | --- | --- | --- | --- |
|  | 1 | 2 | 3 | 4 | 1 | 2 | 3 | 4 | 5 |
| tanδ peak temperature | −55 | −52 | −55 | −54 | −51 | −52 | −54 | −54 | −43 |
| Type A durometer hardness (at ordinary temperature) (H1) | 48 | 50 | 49 | 51 | 50 | 49 | 49 | 52 | 53 |
| Type A durometer hardness (after heat aging) (H2) | 51 | 56 | 52 | 55 | 58 | 56 | 52 | 56 | 62 |
| Change in hardness (H2 − H1) | +3 | +6 | +3 | +4 | +8 | +7 | +3 | +4 | +9 |
| Type A durometer hardness (at 0° C.) (H3) | 50 | 52 | 51 | 53 | 55 | 53 | 51 | 55 | 62 |
| Change in hardness due to temperature change (H3 − H1) | +2 | +2 | +2 | +2 | +5 | +4 | +2 | +3 | +9 |
| Abrasion resistance | 106 | 102 | 104 | 107 | 100 | 98 | 63 | 80 | 93 |

Evaluation Results

Comparative examples 1 and 2, having no aluminum hydroxide blended therein, each suffer a large change in hardness after heat aging (H2–H1) and a large change in hardness due to temperature change (H3–H1). Comparative example 3, blended with 20 parts by weight of aluminum hydroxide C whose untamped density is great and whose DOP oil absorption is small, is considerably inferior in abrasion resistance. Comparative example 4, blended with 20 parts by weight of aluminum hydroxide D whose DOP oil absorption is small and whose crystal structure is of gibbsite type, exhibits poor abrasion resistance. In the case of Comparative example 5 blended with 20 parts by weight of aluminum hydroxide A whose untamped density is small and whose DOP oil absorption and BET specific surface area are within the ranges specified by the present invention, the tanδ peak temperature of the rubber composition is −43° C., which is higher than −45° C., and thus, the hardness change after heat aging (H2–H1) and the hardness change due to temperature change (H3–H1) are both great.

Example 1 is blended with 20 parts by weight of aluminum hydroxide A and 30 parts by weight of carbon black. Examples 2, 3 are blended with 20 parts by weight of aluminum hydroxide A and also blended with carbon black and silica. Example 4 is blended with 20 parts by weight of aluminum hydroxide B and 30 parts by weight of carbon black. Examples 1, 2 and 3 all exhibit small hardness

What is claimed is:

1. A tread rubber composition containing aluminum hydroxide having an untamped density of not more than 0.60 g/cm$^3$, a DOP oil absorption of at least 70 cm$^3$/100 g and less than 250 cm$^3$/100 g, and a BET specific surface area of at least 30 m$^2$/g and not more than 350 m$^2$/g in an amount of 5–60 parts by weight with respect to 100 parts by weight of a rubber component containing at least 80% by weight of polyisoprene rubber and/or polybutadiene, wherein a tanδ peak temperature of the tread rubber composition is not more than −51° C., a type A durometer hardness (H3) at 0° C. is from 48 to 55 and a difference (H3–H1) with a type A durometer hardness (H1) at 20° C. is not more than 3.

2. The tread rubber composition according to claim 1, wherein the untamped density of the aluminum hydroxide is at least 0.10 g/cm$^3$ and not more than 0.35 g/cm$^3$.

3. The tread rubber composition according to claim 1, wherein the aluminum hydroxide has a boehmite crystal structure.

4. The tread rubber composition according to claim 3, wherein the aluminum hydroxide has a crystal size of boehmite (020) plane of at least 5 nm and not more than 20 nm.

5. The tread rubber composition according to claim 1, wherein at least one kind of silane coupling agent expressed by the following general formula (1) or (2) is blended 1–10 parts by weight with respect to 100 parts by weight of the rubber component:

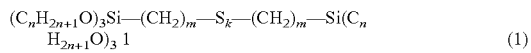 (1)

where m is an integer from 1 to 6, n is an integer from 1 to 4, and k is an integer from 1 to 6,

 (2)

where m is an integer from 1 to 6, n is an integer from 1 to 4, and R is an organic functional group having mercapto group, amino group, epoxy group or vinyl group.

6. A pneumatic tire employing the tread rubber composition according to claim 1.

7. The tread rubber composition according to claim 1, wherein the DOP oil absorption of the aluminum hydroxide is at least 90 cm³/100 g and less than 150 cm³/100 g.

8. The tread rubber composition according to claim 1, wherein the BET specific surface area of the aluminum hydroxide is at least 30 m²/g and not more than 200 m²/g.

9. The tread rubber composition according to claim 1, wherein the BET specific surface area of the aluminum hydroxide is at least 100 m²/g and not more than 200 m²/g.

10. The tread rubber composition according to claim 1, wherein the aluminum hydroxide is present in an amount of 5–40 parts by weight with respect to 100 parts by weight of the rubber component.

11. The tread rubber composition according to claim 5, wherein the at least one kind of silane coupling agent is selected from the group consisting of bis (3-triethoxysilylpropyl) tetrasulfide, bis (2-triethoxysilylethyl) tetrasulfide, bis (3-trimethoxysilylpropyl) tetrasulfide, bis (2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-aminopropyltrimethoxysilane, 3-aminopropyltriethoxysilane, 3-chloropropyltrimethoxysilane, 3-chloropropyltriethoxysilane, 2-chloroethyltrimethoxysilane, 2-chloroethyltriethoxysilane, 3-vinyltrimethoxysilane, and 3-vinyltriethoxysilane.

12. The tread rubber composition according to claim 1, wherein the tread rubber composition further comprises carbon black having a BET specific surface area of at least 70 m²/g and not more than 220 m²/g in an amount of 10–100 parts by weight with respect to 100 parts by weight of the rubber component.

13. The tread rubber composition according to claim 12, wherein the carbon black has the BET specific surface area of at least 70 m²/g and not more than 200 m²/g in an amount of 10–50 parts by weight with respect to 100 parts by weight of the rubber component.

14. The tread rubber composition according to claim 1, wherein the tread rubber composition further comprises silica having a BET specific surface area of at least 70 m²/g and not more than 300 m²/g in an amount of 5–70 parts by weight with respect to 100 parts by weight of the rubber component.

15. The tread rubber composition according to claim 1, wherein at least one other rubber component mixed with the polyisoprene rubber is selected from the group consisting of styrene-butadiene copolymer rubber, butyl rubber, halogenated butyl rubber, acrylonitrile-butadiene rubber, acrylonitrile-styrene-butadiene copolymer rubber, chloroprene rubber, ethylene-propylene copolymer rubber, styrene-isoprene copolymer rubber, styrene-isoprene-butadiene copolymer rubber, isoprene-butadiene copolymer rubber, chlorosulfonic polyethylene, acrylic rubber, epichlorohydrin rubber, silicone rubber, and urethane rubber.

16. The tread rubber composition according to claim 1, wherein styrene-isoprene-butadiene rubber with a styrene content of 20–60% by weight is mixed with the polyisoprene rubber.

17. The tread rubber composition according to claim 1, wherein styrene-isoprene-butadiene rubber with a styrene content of 20–45% by weight is mixed with the polyisoprene rubber.

* * * * *